R. T. GRIFFITH.
TIRE FORMING APPARATUS.
APPLICATION FILED OCT. 26, 1916.
1,215,648.
Patented Feb. 13, 1917.
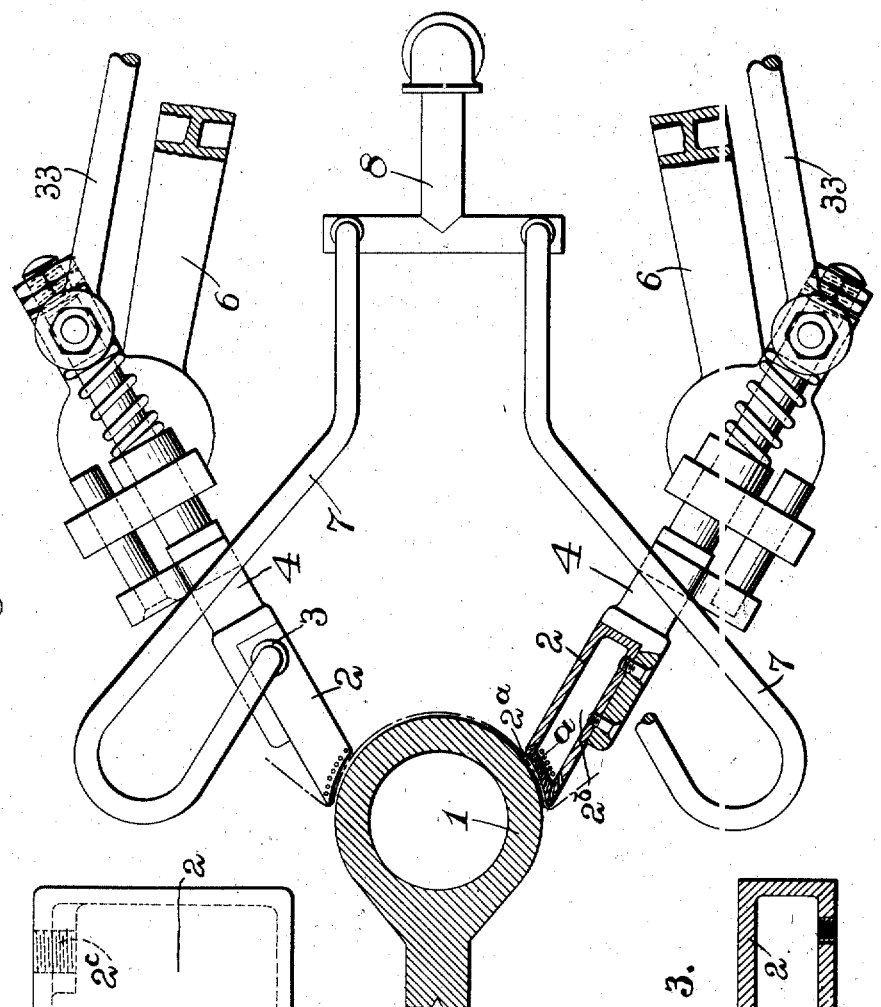
Fig. 1.
Fig. 2.
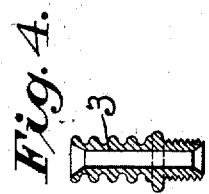
Fig. 4.
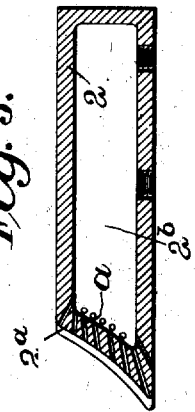
Fig. 3.
Inventor:
Richard T. Griffith,
by Shear Middleton Donaldson & Shear
Atty's.

UNITED STATES PATENT OFFICE.

RICHARD T. GRIFFITH, OF AKRON, OHIO, ASSIGNOR TO THE MILLER RUBBER COMPANY, OF AKRON, OHIO, A CORPORATION OF OHIO.

TIRE-FORMING APPARATUS.

1,215,648.     Specification of Letters Patent.     Patented Feb. 13, 1917.

Application filed October 26, 1916. Serial No. 127,888.

*To all whom it may concern:*

Be it known that I, RICHARD T. GRIFFITH, a citizen of the United States, and resident of Akron, Ohio, have invented certain new and useful Improvements in Tire-Forming Apparatus, of which the following is a specification.

My present invention relates to improvements in methods of and apparatus for forming outer cases for double tube pneumatic tires and more particularly for shaping the successive plies of rubberized fabric to or around the core upon which such tire casings are built.

In machines employed for forming such tire casings an annular core is employed, upon which the plies of rubber impregnated fabric are laid successively.

In order that the fabric may be laid smoothly upon the core, or upon the preceding plies, it is necessary to cut the strips so that the threads will lie at an angle of 45° to the longitudinal edge of the strip and in applying the strips to the rotating core, tension is put upon the fabric so as to elongate the meshes thereof at the tread portion. This tends to cause the central portion to be curved in cross section and to lay smoothly on the core about half way down the sides thereof at which point the meshes remain square.

In order to apply the remaining side portions of the strips it is necessary to use some means which will elongate the meshes radially of the core, thus shortening the side portions of the fabric or contracting them circumferentially of the core.

Heretofore, so far as I am aware, so called stitching tools have been used. Generally these have been in the shape of wheels or disks carried by swinging arms mounted upon a traveling carriage movable radially of the core, such wheels being employed to reduce, as far as possible, the detrimental effects due to the friction of a hard device moving over the sticky surface, but even with such rotating wheels or disks the rubberized fabric is more or less detrimentally affected, such wheels having comparatively sharp edges which have a scraping effect upon the material operated upon.

The present invention aims to provide means which will avoid this scraping effect, and which will effect the proper distortion of the fabric meshes and the shaping of the strips to the core without detrimental effect thereon.

To this end the invention includes the novel method of procedure and the improved apparatus for carrying out said method, my said invention being defined by the appended claims.

Such apparatus is illustrated in the accompanying drawing, in which—

Figure 1 is a plan view of a sufficient portion of a tire building machine to illustrate the invention, a portion of the core only being shown in section.

Fig. 2 is a side elevation of one of the fluid pressure applying devices.

Fig. 3 is a longitudinal section thereof.

Fig. 4 is a detail sectional view of the fluid connection.

Referring by reference characters to this drawing, the numeral 1 designates the core which may be mounted and rotated in the ordinary or any desired manner. At 2, 2, are shown a pair of chambered elements having end surfaces 2ª which are curved to correspond approximately to the surface of that portion of the core over which they are designed to act.

The chamber 2ᵇ of each element is closed except for a plurality of holes or perforations 2ª through its curved face, and a threaded opening 2ᶜ for the reception of a nipple 3 serving for the connection of a pipe for a supply of compressed air.

The elements 2 are mounted upon suitable carriers which may comprise spring pressed rods or bars 4 slidably mounted in brackets pivotally carried by arms 6 and rocked upon their pivots by rods 33 in the manner disclosed in British Patent 18,934 of 1914. While this forms a convenient carrying means, I do not limit myself in this respect as any suitable supporting means may be used which will cause said elements 2 to travel radially of the core during its rotation and maintain the curved and perforated surfaces in close proximity to the fabric.

The nipples 3 are connected by flexible pipes 7 to a common supply pipe 8 communicating with any suitable source of fluid under pressure, preferably air.

In the operation of my invention, after a ply of fabric has been stretched upon the core, the elements 2, 2, are brought in proximity to the fabric and there held. At the same time air under high pressure is admitted to elements 2, 2, through pipe line 8 and emerging from the perforations *a* in the spherical faces forms a lubricating and cushioning film of air between said faces and the fabric. The core is now revolved at a high speed and the elements 2 caused to travel radially of the core and impinge in the bights of the fabric. The skirts of the fabric are thrown out by the centrifugal force as indicated, and in resisting the forward motion of elements 2 the meshes of the fabric are elongated radially of the core but kept from frictional contact therewith by said lubricating cushion of air.

The operation is repeated after each ply of fabric is stretched upon the core.

Having thus described my invention what I claim is:—

1. Apparatus of the class described comprising a core to receive the fabric to be shaped thereon, and a hollow element having a perforated face curved to conform approximately to the surface of said core, means for supplying fluid under pressure to said element, said element and said core being movable relatively to each other.

2. Apparatus of the class described comprising a revoluble core to receive tire forming material and a pair of hollow elements adapted to move radially of the core and having perforated faces curved to conform approximately to the surface of the core and means for supplying fluid under pressure to the interiors of said elements.

3. Apparatus of the class described comprising a revoluble core to receive tire material, a pair of elements adapted to move radially of the core and having faces curved to conform approximately to the surface of said core, and means for maintaining a cushion of fluid between the working faces of said elements and the tire material.

4. Apparatus of the class described comprising a revoluble core to receive the tire material, a pair of hollow elements having faces curved to conform approximately to the surface of the core, said faces having a plurality of perforations therethrough, means for supplying fluid under pressure to the interior of said elements, and means for causing said elements to move radially with relation to the core and to be swung to maintain the perforated faces concentric with the core during such radial movement.

In testimony whereof, I affix my signature.

RICHARD T. GRIFFITH.

Witnesses:
C. A. WOLF,
R. D. HARRIS.